US012083502B2

(12) United States Patent
Tramposch et al.

(10) Patent No.: US 12,083,502 B2
(45) Date of Patent: Sep. 10, 2024

(54) CHEMICAL SORBENT OXIDATION METHOD AND SORBENTS MADE THEREFROM

(71) Applicant: CALGON CARBON CORPORATION, Moon Township, PA (US)

(72) Inventors: Walter G. Tramposch, Moon Township, PA (US); Ryan Walker, Pittsburgh, PA (US)

(73) Assignee: CALGON CARBON CORPORATION, Moon Township, PA (US)

(*) Notice: Subject to any disclaimer, the term of this patent is extended or adjusted under 35 U.S.C. 154(b) by 320 days.

(21) Appl. No.: 16/275,086

(22) Filed: Feb. 13, 2019

(65) Prior Publication Data

US 2019/0247831 A1    Aug. 15, 2019

Related U.S. Application Data

(60) Provisional application No. 62/630,058, filed on Feb. 13, 2018.

(51) Int. Cl.
| | |
|---|---|
| *B01J 21/18* | (2006.01) |
| *B01D 15/00* | (2006.01) |
| *B01J 20/20* | (2006.01) |
| *B01J 20/30* | (2006.01) |
| *B01J 37/08* | (2006.01) |
| *B01J 37/12* | (2006.01) |
| *C02F 1/28* | (2023.01) |

(Continued)

(52) U.S. Cl.
CPC .............. *B01J 21/18* (2013.01); *B01D 15/00* (2013.01); *B01J 20/20* (2013.01); *B01J 20/3078* (2013.01); *B01J 20/3085* (2013.01); *B01J 37/08* (2013.01); *B01J 37/12* (2013.01); *C02F 1/283* (2013.01); *C02F 2101/12* (2013.01); *C02F 2101/16* (2013.01)

(58) Field of Classification Search
None
See application file for complete search history.

(56) References Cited

U.S. PATENT DOCUMENTS

| | | |
|---|---|---|
| 4,624,937 A | 11/1986 | Chou |
| 4,921,826 A | 5/1990 | Juntgen et al. |
| 5,338,458 A | 8/1994 | Carrubba et al. |

(Continued)

FOREIGN PATENT DOCUMENTS

| | | |
|---|---|---|
| CA | 2485103 A1 | 11/2003 |
| CN | 101108304 A | 1/2008 |

(Continued)

OTHER PUBLICATIONS

Machine translation of CN 103626150A, pp. 1-7. (Year: 2014).*

(Continued)

*Primary Examiner* — Clare M Perrin
(74) *Attorney, Agent, or Firm* — DLA Piper LLP (US)

(57) ABSTRACT

Sorbent materials are described that have enhanced performance in removing chlorine and chloramine, among other toxic compounds. The sorbent materials are formed by a process which includes steps of oxidation using an oxidizing agent, adding a nitrogen-containing compound, and calcining the sorbent.

6 Claims, 3 Drawing Sheets

(51) Int. Cl.
*C02F 101/12* (2006.01)
*C02F 101/16* (2006.01)

(56) References Cited

U.S. PATENT DOCUMENTS

| | | | |
|---|---|---|---|
| 5,356,849 | A | 10/1994 | Matviya et al. |
| 5,444,031 | A | 8/1995 | Hayden |
| 5,504,050 | A * | 4/1996 | Hayden .................. B01J 21/18 |
| | | | 423/579 |
| 6,342,129 | B1 | 1/2002 | Vaughn et al. |
| 6,706,194 | B2 | 3/2004 | Baker et al. |
| 7,361,280 | B2 | 4/2008 | Baker |
| 7,923,410 | B2 | 4/2011 | Turk et al. |
| 9,174,205 | B2 | 11/2015 | Reimerink-Schats et al. |
| 10,702,853 | B2 | 7/2020 | Mazzoccoli et al. |
| 2008/0073290 | A1 | 3/2008 | Ryan et al. |
| 2008/0161183 | A1 | 7/2008 | Popov et al. |
| 2011/0076210 | A1 | 3/2011 | Pollack et al. |
| 2012/0220451 | A1 | 8/2012 | Miyata et al. |
| 2013/0023405 | A1* | 1/2013 | Hitomi .................. B01J 35/002 |
| | | | 502/180 |
| 2013/0168321 | A1* | 7/2013 | Cannon ................ B01J 20/3248 |
| | | | 210/683 |
| 2014/0013942 | A1* | 1/2014 | Wojtowicz ............. B01D 53/02 |
| | | | 95/95 |
| 2014/0186625 | A1* | 7/2014 | Wong ................... B01D 53/002 |
| | | | 252/186.1 |
| 2016/0023920 | A1 | 1/2016 | Doyle et al. |
| 2016/0236169 | A1 | 8/2016 | Doughty et al. |
| 2016/0346723 | A1 | 12/2016 | Honore et al. |
| 2017/0173557 | A1 | 6/2017 | Olson et al. |
| 2017/0247258 | A1* | 8/2017 | Bae ....................... C01B 32/342 |
| 2019/0201870 | A1 | 7/2019 | Kumar Pal et al. |

FOREIGN PATENT DOCUMENTS

| | | |
|---|---|---|
| CN | 101757902 A | 6/2010 |
| CN | 102065695 A | 5/2011 |
| CN | 102553641 A | 7/2012 |
| CN | 103547364 A | 1/2014 |
| CN | 103566882 A | 2/2014 |
| CN | 103626150 A * | 3/2014 |
| CN | 103751943 A | 4/2014 |
| CN | 104169225 A | 11/2014 |
| CN | 104368309 A | 2/2015 |
| CN | 104602806 A | 5/2015 |
| CN | 105120982 A | 12/2015 |
| DE | 3620425 C1 | 6/1987 |
| JP | H-01-058331 | 3/1989 |
| JP | H10296043 A | 11/1998 |
| JP | 2009056449 A | 3/2009 |
| PL | 400410 A1 | 2/2014 |
| WO | 94-16814 A1 | 8/1994 |
| WO | 2009-140033 A2 | 11/2009 |
| WO | 2014164275 A1 | 10/2014 |

OTHER PUBLICATIONS

Seredych et al. (Carbon, 2008, 46, 1475-1488). (Year: 2008).*
International Search Report and Written Opinion for PCTUS2019/17878 dated Jun. 6, 2019.
Sharifi et al., "Formation of Active Sites for Oxygen Reduction Reactions by Transformation of Nitrogen Functionalities in Nitrogen-Doped Carbon Nanotubes." ACS Nano, vol. 6, No. 10, 2012, pp. 8904-8912, doi:10.1021/nn302906r.
"The Chemistry of Nitrogen and Phosphorous." Purdue Chemistry, Purdue University, (2006). chemed.chem.purdue.edu/genchem/topicreview/bp/ch10/group5.php#negative.
Seredych et al., "Surface functional groups of carbons and the effects of their chemical character, density and accessibility to ions on electrochemical performance", Carbon, Sep. 2008, vol. 46(11):1475-1488.

* cited by examiner

CHEMICAL SORBENT OXIDATION METHOD AND SORBENTS MADE THEREFROM

BACKGROUND

Sorbent materials having high surface areas and which have been chemically modified to have catalytic properties are well known for their oxidative and decomposition properties. These properties find use in a variety of fields, in particular the removal and destruction of chlorine, chloramine, trihalomethanes, haloacetic acids, and hydrogen peroxides which are formed when water is disinfected. The sorbent materials are typically formed from various activated carbons and carbonaceous chars which are thermally treated with a nitrogen-containing precursor followed by activation and/or oxidation to produce the catalytic activated carbon. Alternately, a nitrogen-containing precursor can be charred and activated. Activation and/or oxidation is normally carried out at high temperature with an activating gas such as steam (water), carbon dioxide, or oxygen. These methods are described in several U.S. Patents, including U.S. Pat. Nos. 6,342,129, 6,706,194, 5,356,849, 5,338,458, and 9,174,205, all of which are incorporated by reference in their entirety.

There are disadvantages to the prior art nitrogen pretreatment and activation and/or oxidation techniques. The activation and/or oxidizing process gasifies the surface portion of the carbonaceous char or other sorbent material, which results in small pores being formed as the carbon or other material on the surface of the sorbent particles vaporizes. These pores are responsible for the high total surface area of the sorbent material, and therefore its high performance. However, this gasification during the activation process is not selective to the materials being removed from the surface through vaporization, because oxygen in its various forms (air, pure $O_2$, dissociated oxygen from steam, dissociated oxygen from $CO_2$, etc.) at high temperatures is a powerful carbon gasifying and oxidizing agent. As a result, much of the incorporated nitrogen which is responsible for the catalytic activity and which is part of the surface skeleton of the sorbent material is removed during activation and/or oxidation processes. This is counterproductive and reduces the catalytic properties of the sorbent materials, and therefore its performance in the removal and destruction of deleterious compounds from water.

In U.S. Patent Application Publication No. 2018/0229217 filed on Feb. 13, 2018, and which claimed priority to U.S. Provisional Application 62/458,371 filed on Feb. 13, 2017, we disclose improved processes for treating sorbent materials so that they have high surface area and excellent catalytic functionality. Both of those disclosures are incorporated by reference in their entirety.

There is a continued need for improvement of the various steps of forming sorbent materials. The present invention provides these improvements with a novel process. In particular, this specification is directed to improved processes of chemical oxidation of sorbents.

SUMMARY

The invention discloses methods for making sorbents, as well as the sorbents which are made by the inventive processes. The invention further discloses filter assemblies which are formed by including the sorbents disclosed herein.

In one embodiment, there is a method for making a sorbent material product, the method comprising: providing a sorbent material feedstock; oxidizing the sorbent material feedstock with an oxidizing agent, the oxidizing agent selected from the group consisting of nitric acid, potassium peroxymonosulfate, potassium persulfate, ammonium persulfate, sodium persulfate, hydrogen peroxide, peracetic acid, acetic acid, calcium hypochlorite, sodium hypochlorite, hypochlorous acid, benzoyl peroxide, sodium percarbonate, sodium perborate, organic peroxides, organic hydroperoxides, bleaching compounds, peroxide-based bleach, chlorine-based bleach, a mixture of hydrogen peroxide and urea, a mixture of peracetic acid and urea, and combinations thereof; adding a nitrogen-containing precursor to the oxidized sorbent material feedstock, wherein the nitrogen-containing precursor is a reduced nitrogen compound; and heating the oxidized sorbent material feedstock and nitrogen-containing precursor to a temperature of at least about 400° C. under an inert atmosphere to thereby form the sorbent material product.

In another embodiment, the sorbent material product has a chloramine destruction number (CDN) of at least about 2.0, wherein the CDN is the absolute value of the first order linear kinetic fit, multiplied by 1000, that is applied to natural log of a concentration of chloramine in water versus time when the initial concentration of chloramine is decreased over a period of 150 minutes.

In another embodiment, the sorbent material product has a CDN of at least about 5.0.

In another embodiment, the sorbent material product has a CDN of about 10.0 to about 60.0.

In another embodiment, the sorbent material product has a chlorine destruction number (C1-DN) of at least about 80.0, wherein the C1-DN is the absolute value of the first order linear kinetic fit, multiplied by 1000, that is applied to natural log of a concentration of chlorine in water versus time when the initial concentration of chlorine is decreased over a period of 150 minutes.

In another embodiment, the C1-DN value is about 80.0 to about 250.0.

In another embodiment, the formed sorbent has a nitrogen edge concentration of at least about 0.20 atom %.

In another embodiment, the sorbent material product has a nitrogen edge concentration of about 0.20 atom % to about 2.0 atom %.

In another embodiment, the nitrogen-containing precursor has an oxidation state of −3.

In another embodiment, the sorbent material feedstock includes at least one of activated carbon, reactivated carbon, activated coke, and combinations thereof.

In another embodiment, the heating the oxidized sorbent material feedstock and nitrogen-containing precursor is to a temperature of at least 700° C. under an inert atmosphere to thereby form the sorbent material product.

In one embodiment, there is a sorbent material product having a nitrogen edge concentration of at least about 0.20 atom % and a chloramine destruction number (CDN) of at least about 2.0, wherein the CDN is the absolute value of the first order linear kinetic fit, multiplied by 1000, that is applied to a natural log of a concentration of chloramine in water versus time when the initial concentration of chloramine is decreased over a period of 150 minutes.

In another embodiment, the sorbent material product is formed by a method comprising the steps of: providing a sorbent material feedstock; oxidizing the sorbent material feedstock with an oxidizing agent, the oxidizing agent selected from the group consisting of nitric acid, potassium peroxymonosulfate, potassium persulfate, ammonium persulfate, sodium persulfate, hydrogen peroxide, peracetic acid, acetic acid, calcium hypochlorite, sodium hypochlorite, hypochlorous acid, benzoyl peroxide, sodium percarbonate, sodium perborate, organic peroxides, organic hydroperoxides, bleaching compounds, peroxide-based bleach, chlorine-based bleach, a mixture of hydrogen peroxide and urea, a mixture of peracetic acid and urea, and combinations thereof; adding a nitrogen-containing precursor to the oxidized sorbent material feedstock, wherein the nitrogen-containing precursor is a reduced nitrogen compound; and heating the oxidized sorbent material feedstock and nitrogen-containing precursor to a temperature of at least about 400° C. under an inert atmosphere to thereby form the sorbent material product.

In another embodiment, the sorbent material product has a CDN of about 10.0 to about 60.0.

In another embodiment, the sorbent material product has a CDN of at least about 5.0.

In another embodiment, the sorbent material product has a chlorine destruction number (Cl-DN) of at least about 80.0, wherein the Cl-DN is the absolute value of the first order linear kinetic fit, multiplied by 1000, that is applied to natural log of a concentration of chlorine in water versus time, and wherein the initial concentration of chlorine is decreased over a period of 150 minutes.

In another embodiment, the Cl-DN value is about 80.0 to about 250.0.

In another embodiment, the sorbent material product has a nitrogen edge concentration of about 0.20 atom % to about 2.0 atom %.

In another embodiment, the nitrogen-containing precursor has an oxidation state of −3.

In another embodiment, the sorbent material product includes a sorbent material feedstock that is at least one of activated carbon, reactivated carbon, activated coke, and combinations thereof.

In another embodiment, the heating the oxidized sorbent material feedstock and nitrogen-containing precursor is to a temperature of at least 700° C. under an inert atmosphere to thereby form the sorbent material product.

In one embodiment, there is a filter apparatus comprising: a sorbent material product having a nitrogen edge concentration of at least about 0.20 atom % and a chloramine destruction number (CDN) of at least about 2.0, wherein the CDN is the absolute value of the first order linear kinetic fit, multiplied by 1000, that is applied to a natural log of a concentration of chloramine in water versus time when the initial concentration of chloramine is decreased over a period of 150 minutes.

In another embodiment, the sorbent material product is formed by a method comprising the steps of providing a sorbent material feedstock; oxidizing the sorbent material feedstock with an oxidizing agent, the oxidizing agent selected from the group consisting of nitric acid, potassium peroxymonosulfate, potassium persulfate, ammonium persulfate, sodium persulfate, hydrogen peroxide, peracetic acid, acetic acid, calcium hypochlorite, sodium hypochlorite, hypochlorous acid, benzoyl peroxide, sodium percarbonate, sodium perborate, organic peroxides, organic hydroperoxides, bleaching compounds, peroxide-based bleach, chlorine-based bleach, a mixture of hydrogen peroxide and urea, a mixture of peracetic acid and urea, and combinations thereof; adding a nitrogen-containing precursor to the oxidized sorbent material feedstock, wherein the nitrogen-containing precursor is a reduced nitrogen compound; and heating the oxidized sorbent material feedstock and nitrogen-containing precursor to a temperature of at least about 400° C. under an inert atmosphere to thereby form the sorbent material product.

In another embodiment, the sorbent material product includes a sorbent material feedstock that is at least one of activated carbon, reactivated carbon, activated coke, and combinations thereof.

In another embodiment, the filter apparatus further comprises at least one of a binder, a filler, or at least one or more additional sorbent material.

In another embodiment, the sorbent material product is contained within the filter apparatus as a particle, solid monolith, block, extruded shape, molded shape, pressed shape, rolled substrates or sheet, flat substrate or sheet, spun-bonded shape, or wet molded shapes formed from fiber slurries, or is contained within more than one of the preceding structures.

In another embodiment, heating the oxidized sorbent material feedstock and nitrogen-containing precursor is to a temperature of at least 700° C. under an inert atmosphere to thereby form the sorbent material product.

In another embodiment, the sorbent material product has a CDN of at least about 5.0.

In one embodiment, there is a method of treating liquids, the method comprising contacting the liquids with sorbent material product having a nitrogen edge concentration of at least about 0.20 atom % and a chloramine destruction number (CDN) of at least about 2.0, wherein the CDN is the absolute value of the first order linear kinetic fit, multiplied by 1000, that is applied to a natural log of a concentration of chloramine in water versus time when the initial concentration of chloramine is decreased over a period of 150 minutes.

In another embodiment, the sorbent material product has a CDN of at least about 5.0.

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a", "an", and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent" means any material that exhibits adsorbent properties, absorbent properties, or a combination of adsorbent properties and absorbent properties. Adsorbent properties means that atoms, ions, or molecules adhere to the adsorbent material surface. Absorbent properties means that atoms, ions, or molecule enter and are retained by a bulk phase of the absorbent material.

As used herein, the term "sorbent raw material" means any material that is untreated or substantially untreated and that is capable of being processed to form a material that exhibits sorbent properties.

As used herein, the term "sorbent intermediate material" means any sorbent material or sorbent raw material that has undergone at least one treatment step.

As used herein, the term "sorbent material feedstock" means any material that is capable of being used to form any sorbent. The sorbent material feedstock is not limited and includes one or more of a sorbent raw material and a sorbent intermediate material.

As used herein, the term "sorbent material product" means any material that exhibits sorbent properties following at least one treatment step of a sorbent material feedstock.

As used herein, the term "reduced nitrogen" means any nitrogen-containing molecule or nitrogen-containing compound where the nitrogen has an oxidation state of −3.

In some embodiments, the specification discloses compositions for the removal of chloramine, chlorine, peroxides, and other deleterious compounds using sorbent and methods for making such sorbents. In other embodiments, the invention discloses devices and apparatus such as filters that contain the catalytic adsorbent material. The devices and apparatus include water filters and liquid filters. In other embodiments, the invention is directed to methods of using these devices and apparatus for the removal of harmful compounds such as chloramine, chlorine, and peroxides.

The embodiments include methods for making a sorbent material product and sorbents prepared by such methods. The methods may include the step of oxidizing a sorbent material feedstock. The step of oxidizing the sorbent material feedstock may take place before the addition of a nitrogen-containing precursor. The step of oxidizing may be carried out by various techniques. In some embodiments, the step of oxidizing includes contacting the sorbent material feedstock with an oxidizing agent. In some embodiments, the oxidizing agent includes at least one of nitric acid, potassium peroxymonosulfate, potassium persulfate, ammonium persulfate, sodium persulfate, hydrogen peroxide, peracetic acid, acetic acid, calcium hypochlorite, sodium hypochlorite, hypochlorous acid, benzoyl peroxide, sodium percarbonate, sodium perborate, organic peroxides, organic hydroperoxides, bleaching compounds, peroxide-based bleach, chlorine-based bleach, a mixture of hydrogen peroxide and urea, a mixture of peracetic acid and urea, and combinations of one or more of the above.

In some embodiments, the step of oxidizing includes steps of heating or otherwise treating the sorbent material feedstock and the chemical oxidant(s) or oxidizing agent. In such embodiments, the step of heating includes heating the sorbent material feedstock and the oxidizing agent to a temperature of about 25° C., about 50° C., about 75° C., about 100° C., about 125° C., about 150° C., about 175° C., about 200° C., about 225° C., about 250° C., about 275°, about 300° C., about 325° C., about 350° C., about 375° C., about 400° C., and any range that is formed by the combination of any two of the above values. In some embodiments, the step of heating is performed in any range where the above temperature values are the lower bound of a range, i.e., heating is performed at least about 25° C., at least about 50° C., at least about 100° C., at least about 125° C., at least about 150° C., at least about 175° C., at least about 200° C., at least about 225° C., at least about 250° C., at least about 275°, at least about 300° C., at least about 325° C., at least about 350° C., at least about 375° C., at least about 400° C., or any combination of one or more of the preceding ranges. In still further embodiments, the step of oxidizing is a non-thermal process and is performed without the addition of any external heating to the mixture of the oxidant and/or sorbent material feedstock.

In some embodiments, multiple oxidizing steps are performed on the sorbent material feedstock. The sorbent material feedstock includes one or more of a sorbent raw material or a sorbent intermediate material. The number of oxidizing steps is not limited, and can be at least one oxidizing step, at least two oxidizing steps, at least three oxidizing steps, or at least four oxidizing steps. The steps are denoted first oxidizing step, second oxidizing step, third oxidizing step, fourth oxidizing step, and so forth. The above described step(s) of contacting the sorbent material feedstock with an oxidizing agent is, in some embodiments, combined with step(s) of oxidizing the sorbent material feedstock under specified atmospheric conditions, which are described below.

The additional step or steps of oxidizing the sorbent material feedstock under a specified atmosphere includes one or more of a specified atmospheric temperature, a specified atmospheric composition, or a specified atmospheric pressure. In some embodiments, the combined step of an additional oxidizing process is carried out by exposing the sorbent material feedstock to an oxygen containing environment and heating the feedstock to a temperature of about 150° C. to about 1050° C. In some embodiments, the temperature of oxidizing is about 150° C. to about 250° C., about 250° C. to about 350° C., about 350° C. to about 450° C., about 450° C. to about 550° C., about 550° C. to about 650° C., about 650° C. to about 750° C., about 750° C. to about 850° C., about 850° C. to about 950° C., about 950° C. to about 1050° C., or any of those disclosed endpoints, or any range that is made of a combination of any of the above ranges or values within those ranges.

In other embodiments, an oxidizing step is performed in an oxygen containing environment that contains atmospheric air, oxygen, steam, ozone, oxygen plasma, nitrogen oxide, and hydrogen peroxide, carbon dioxide, inert gas, noble gas, or any combination of one or more the above. The sorbent material feedstock is contacted with or placed within the above oxygen containing environment. The amount of oxygen is not limited. In some embodiments, the amount of oxygen is about 5 vol. %, about 10 vol. %, about 15 vol. %, about 20 vol. %, about 20.95 vol. % (i.e., air), about 25 vol.

%, about 30 vol. %, about 35 vol. %, about 40 vol. %, about 45 vol. %, about 50 vol. %, about 55 vol. %, about 60 vol. %, about 65 vol. %, about 70 vol. %, about 75 vol. %, about 80 vol. %, about 85 vol. %, about 90 vol. %, about 95 vol. %, or about 100 vol. % (i.e., pure oxygen). The amount of oxygen can be any combination of one or more of the above values to form a range. In some embodiments, the range is about 0 vol. % to about 20 vol. %, about 0 vol. % to about 20.95 vol. %, about 20 vol. % to about 40 vol. %, about 40 vol. % to about 60 vol. %, about 60 vol. % to about 80 vol. %, or about 80 vol. % to about 100 vol. %.

In some embodiments, the oxygen containing environment is dry, and includes no moisture or substantially no measurable moisture. In other embodiments, the oxidation environment of any of the above compounds can also be humidified. The level of humidification can be about 10-20%, about 20-40%, about 40-60%, about 60-80%, about 80-100%, about 100% or saturated, or values and ranges derived from any combination of the above endpoints or ranges. Each of the above values is measured as relative humidity, which means the present state of absolute humidity relative to a maximum humidity for a given temperature.

In some embodiments, oxidation is accomplished by a non-thermal process. In such embodiments, the sorbent is oxidized by contacting the sorbent with hydrogen peroxide, ozone, chlorine, persulfates, percarbonates, oxidizing acids such as nitric acid, or any combination thereof in the liquid or vapor phase at temperatures less than about 100° C. It should be noted that some sorbents including carbons slowly oxidize in the presence of air with or without moisture at room temperature and this oxidation, although slow, would be eventually be sufficient to produce an oxidized sorbent precursor. In some embodiments, the oxidizing step is omitted, i.e., the sorbent material feedstock is not oxidized by any step faster than the above described slow oxidation that takes place naturally at room temperature under normal conditions.

The sorbent material feedstock of the embodiments of this disclosure is not limited and is any material known in the art. In some embodiments, the sorbent material feedstock is a sorbent raw material. The sorbent raw material is not limited and includes one or more of carbonaceous materials, carbon black, bituminous coal, sub-bituminous coal, lignite coal, anthracite coal, peat, nut shells, pits, coconut shell, babassu nut, macadamia nut, dende nut, peach pit, cherry pit, olive pit, walnut shell, wood, lignin, polymers, nitrogen-containing polymers, resins, nitrogen-containing resins, petroleum pitches, bagasse, rice hulls, corn husks, wheat hulls and chaff, graphenes, carbon nanotubes, graphite, zeolite, silica, silica gel, alumina clay, diatomaceous earth, metal oxides, molecular sieves, or any combination of the listed materials. In some embodiments, the sorbent material feedstock is a sorbent intermediate material. The sorbent intermediate material is not limited and includes one or more of activated carbon, reactivated carbon, or activated coke. In some embodiments, the sorbent material feedstock is provided in a preoxidized state. For example, the sorbent material feedstock may be a sorbent intermediate product that is oxidized. In other embodiments, the sorbent material feedstock is provided in an unoxidized state. For example, the sorbent material feedstock may be a sorbent intermediate product or a sorbent raw material that has not been oxidized.

In some embodiments, after oxidation is complete, a sorbent intermediate product is contacted with a reduced nitrogen-containing compound. As noted above, the term "reduced nitrogen" means any nitrogen-containing molecule or nitrogen-containing compound where the nitrogen has an oxidation state of −3. The reduced nitrogen-containing compound includes one or more of ammonia, ammonium salts, ammonium carbonate and bicarbonate, ammonium thiocyanate, azodicarbonamide, diammonium phosphate, dicyandiamide, guanidine hydrochloride, guanidine thiocyanate, guanine, melamine, thiourea, and urea. The step of contacting can be carried out by any method. For example, contacting a sorbent intermediate product can be achieved by dry mixing the sorbent intermediate product with a reduced nitrogen-containing compound, impregnating the sorbent intermediate product with a solution of a reduced nitrogen-containing compound, or contacting the sorbent intermediate product with a gaseous reduced nitrogen-containing compound.

In other embodiments, the source of nitrogen can be the sorbent material feedstock itself, alone or in combination with added reduced nitrogen-containing feedstocks. Such nitrogen-containing feedstocks are not limited. Examples of nitrogen-containing feedstocks include one or more of nitrogen-containing monomers and nitrogen-containing polymers. In some embodiments, the nitrogen-containing feedstocks are monomers, oligomers, or polymers of acrylonitrile, polyacrylonitrile, urethane, polyurethane, amides, polyamides, nitrile rubber, and combinations of one or more of those. If nitrogen-containing feedstocks are selected, these may be combined with the disclosed steps of adding further nitrogen precursors, or these can be used alone, omitting the further steps of adding nitrogen precursors. In some alternative embodiments, the sorbent intermediate materials that are produced by the activation of nitrogen-containing feedstocks are mixed with other sorbent intermediate materials or other sorbent treated according to the invention as an alternative to mixing other, untreated sorbents.

In some embodiments, the sorbent material feedstock is calcined by heating to a temperature greater than about 400° C. before, during, or both before and during exposure to the nitrogen-containing compound. In some embodiments, the sorbent material feedstock is calcined by heating to a temperature greater than about 700° C. before, during, or both before and during exposure to the nitrogen-containing compound. In some embodiments, heating is carried out after contacting the feedstock with a nitrogen-containing compound. Calcination is, generally, carried out by heating the sorbent raw material or the sorbent intermediate products to a temperature sufficient to reduce the presence of surface oxides on the sorbent raw material or the sorbent intermediate products. The temperature at which surface oxides are removed may be about 400° C. to about 1050° C., about 400° C. to about 1000° C., about 600° C. to about 1050° C., about 800° C. to about 1050° C., about 850° C. to about 950° C., or any temperature range that incorporates the above endpoints or which falls within the scope of the above listed ranges. The temperature of the heating and/or calcining may be about 350° C., about 400° C., about 450° C., about 500° C., about 550° C., about 600° C., about 650° C., about 700° C., about 750° C., about 800° C., about 850° C., about 900° C., about 950° C., about 1000° C., about 1050° C., about 1100° C., about 1150° C., about 1200° C., or any range that is formed from any two of those values as endpoints. The calcination process atmospheres may include inert nitrogen gas or the noble gases helium, argon, neon, krypton, xenon, and radon. Heating and/or calcining can be carried out for a time period of about 1 to about 120 minutes. Following heating and/or calcining, the resultant sorbent intermediate product or sorbent material product may be cooled in an inert and/or noble gas atmosphere.

In particular embodiments, sorbent intermediate products or sorbent material products can be prepared by repeating the various steps of the above described processes. For example, the steps of oxidation, exposure to nitrogen-containing compounds, or calcinations may each individually be repeated 1, 2, 3, 4, 5, or 6 times after the first such step of oxidation, exposure to nitrogen-containing compounds, or calcination. In some embodiments, the steps of calcinations, activation, and inert cooling may each individually be repeated 1, 2, 3, 4, 5, or 6 times after the first such step of calcination, activation, or inert cooling. Alternatively, any other method known to generate catalytic activity in high temperature sorbent material feedstocks may be applied to the resultant product to further enhance its catalytic activity. Steps of gas or oxygen based oxidation may further be combined with steps of liquid or chemical based oxidation, for example, a step of oxidation in air may be followed by oxidation in peracetic acid.

In some embodiments, the sorbent intermediate materials are processed to render them suitable for their intended application. Such additional processing steps to the sorbent intermediate materials are not limited, and include, for example, pulverizing, dry admixing, impregnating, sorting, grading, screening, briquetting, or agglomerating the sorbent intermediate materials. The additional steps can be carried out at any time during the process, and individual steps or certain steps can be repeated.

In some embodiments, the sorbent material product has a mean particle diameter (MPD) of about 4 mm or less, and in certain embodiments, the sorbent material product has a MPD of about 1 μm to about 4 mm, about 100 μm to about 4 mm, about 0.1 mm to about 4 mm, about 0.5 mm to about 4 mm, about 1.0 mm to about 4 mm, about 4.0 μm to about 1.5 mm, about 2.0 μm to about 3.5 mm, about 1 μm to about 3 mm, any subrange contained within any of these ranges, or any range that is formed from the a combination of the endpoints of those ranges. The pore geometry of the sorbent may vary among embodiments, and the sorbent may have a distribution of pores including macropores (greater than 50 nm diameter), mesopores (2 nm to 50 nm diameter), and micropores (less than 2 nm diameter).

The pore size distribution may affect the types of materials that can be adsorbed by the sorbent. For hydrocarbon molecules especially, the propensity of a molecule to be adsorbed by the activated carbon is dependent on the pore size. Thus, the pore sizes, and the distribution of pore sizes, can be selected to determine which chemical species will or will not be adsorbed by the sorbent. A narrow pore size distribution can be used to adsorb only a few selected contaminants, while a wide pore size distribution can adsorb a greater variety of compounds.

The sorbent material products described above are useful in water purification systems, and in particular, water purification systems that are used for purification of drinking water. Still further embodiments of the disclosure are directed to filter devices such as, for example, filters, filter cartridges, beds, and particulate or powdered carbon and the like, in which the adsorbent material product described above are included. One or more of the above filter devices may be used in combination.

The filter devices, especially consumer filters of various embodiments may have any design and may at least include a housing, the housing including a compartment configured to hold the sorbent material products of the disclosure. The form of the sorbent material product is not limited, and includes at least one of a granulated structure, a powdered structure, a solid structure, a porous structure, and combinations of those. These various forms can be used for sorbent material products including activated carbon or any other sorbent material product.

In some embodiments, the sorbent material product that is used in the filter devices is provided in the form of solid monoliths, blocks, extruded shapes, molded shapes, pressed shapes, rolled substrates or sheets, flat substrates or sheets, spun-bonded shapes, or wet molded shapes formed from fiber slurries, or combinations thereof. Each of the above are formed from the mixture of a sorbent material product or sorbent intermediate material with a binder or filler. The binder is not limited and includes at least one of polymers, adhesives, carbonizable material, and combinations thereof to produce a solid structure with the sorbent material. Examples of binder materials include polyolefins, polyethylene, polypropylene, polyvinyl chloride, polyethylene terephthalate, polyvinyl acetate, acrylic and acrylates, nylons and other polyesters, acrylonitrile, and combinations of one or more of these. The filler is not limited and includes oxides, ceramics, clays, and minerals.

In some embodiments, the filter devices include additional components such as, for example, screens or other means for holding the activated carbon in the compartment or additional purification devices such as filtration membranes and the like. In some embodiments, the housing may include various components necessary to allow the filter to be integrated into a device such as a pitcher or bottle device in which water flows from one compartment to another and passes through the filter during transfer, a device that attaches to a water line or faucet that cause water to pass through the filter before being expelled from the faucet or otherwise delivered to a water dispensing device. In particular, the filter device may include an inlet port for introducing water into the filter and an outlet port for dispensing the filtered or treated water from the filter. In some embodiments, the filter device may include a removable connecting means to connect to a water source such as a sink pipe, hose, tube fittings, faucet, water fountain and the like at the inlet port.

It should be noted that within filters devices or when supplied in bulk, the sorbent material product or sorbent intermediate materials of the disclosure can be blended with other sorbent materials. Such blending can occur during the manufacture of the sorbent materials themselves or during the manufacture of the filter device. In some embodiments, the sorbent material product or sorbent intermediate materials of the disclosure are blended within the manufacturing apparatus for manufacturing the filter devices, such as mixed within the extrusion apparatus or the injection molding apparatus. In some embodiments, the sorbent material product or sorbent intermediate material of the disclosure is blended with other sorbent materials that are provided to remove the same compounds (i.e., chloramine and chlorine) or other compounds. The other contaminants to be removed include nitrite, lead, mercury, arsenic, and organic compounds.

In some embodiments, the filter device may include a filter housing having an elongated envelope composed of an inert plastic material such as polystyrene, polyethylene, polypropylene, polyvinylchloride, polytetrafluoroethylene, polyethylene terephthalate, silicone, crosslinked polyethylene (PEX), or any combination thereof disposed within the filter housing for retaining the low contact pH activated carbon or mixture of low contact pH activated carbon and neutral activated carbon. The filter housing may also be made of any suitable metal, such as aluminum, steel, stainless steel, titanium, magnesium, and combinations thereof.

The filter housing may also be formed of a metalized plastic, such as any of the polymers listed above with electroplated or electroless plated or vapor deposited aluminum, steel, stainless steel, titanium, magnesium, chromium, and combinations thereof. The filter housing and the envelope can be spaced from one another, and in some embodiments, a particulate filter such as, for example, filter paper may be disposed within the space to retain dust associated with the activated carbon. In particular embodiments, additional adsorbents, such as, carbon cloth may be disposed within the space. In some embodiments, the filter may include a perforated plate, slotted grate, mesh grill, screen, or other means for securing the envelope within the housing while allowing free flow of fluid through the housing.

In some embodiments, the sorbent material feedstock that has been treated in accordance with the invention to form a sorbent intermediate material may be mixed with other sorbent material feedstocks (i.e. sorbent raw materials) which have not been treated by the steps of the invention. The sorbent material feedstock, sorbent intermediate products, and sorbent raw materials are the same as disclosed above.

The amount of sorbent raw material that has not been treated which is to be mixed with the sorbent intermediate products of the disclosure can be any amount that is useful to achieve the desired final performance. The amount of sorbent raw material that is untreated can be about 5-95 wt. %, about 20-95 wt. %, about 40-95 wt. %, about 60-95 wt. %, about 80-95 wt. %, or any combination of the previously listed ranges, based on 100% of the total mixture of treated and untreated sorbent materials. In some embodiments, the amount of untreated sorbent can be about 10 wt. %, about 20 wt. %, about 30 wt. %, about 40 wt. %, about 50 wt. %, about 60 wt. %, about 70 wt. %, about 80 wt. %, about 90 wt. %, or about 95 wt. % based on 100 wt. % of the entire composition. At least two above amounts may be combined to form the endpoints of ranges.

Commercial or municipal water treatment devices may include larger filter devices or tanks designed to attach to large high flow water pipes that provide beds positioned to receive water from a natural source during treatment. Such devices are well known in the art and the chlorine and chloramine destroying activated carbon can be included in any such device. In some embodiments, beds or tanks including granular activated carbon can be positioned at various places along the flow path of the treatment plant, and chlorine and chloramine destroying activated carbon as described above can be used by any one or all of these beds or tanks. In certain embodiments, the water may be contacted with sorbent material product at one or more locations in the treatment path, and in such embodiments, the sorbent material product may be chlorine and chloramine destroying sorbent material product. As discussed above, in such treatment devices, the granulated or powdered chlorine and chloramine destroying sorbent material product can be used alone or in a mixture of chlorine and chloramine destroying sorbent material product and non-chlorine and chloramine destroying sorbent material product. The treatment devices and facilities may include additional tanks and components, such as, for example, equalization basins, clarifiers, biological treatment basins or tanks, sand filtration devices, membrane filtration devices, and the like and combinations thereof. Alternatively, the treatment facilities include sorbent holding tanks where powdered activated carbon is added to the water to be treated and then collected following sorption.

Further embodiments are directed to methods for purifying water using the chlorine and chloramine destroying sorbent material products described above. The step of contacting can be carried out by any means including, for example, flowing water over or through a bed of chlorine and chloramine destroying sorbent material products or mixture of chlorine and chloramine destroying activated carbon and non-chlorine and chloramine destroying sorbent material products, introducing water onto a filter device including chlorine and chloramine destroying activated carbon or a mixture of chlorine and chloramine destroying activated carbon and non-chlorine and chloramine destroying sorbent material products, introducing sorbent material products having chlorine and chloramine destroying sorbents or a mixture of chlorine and chloramine destroying sorbent material products and non-chlorine and chloramine destroying into a container for holding water, and the like. In some embodiments, the method includes additional steps. For example, in some embodiments, methods for purifying water include the steps of filtering the water using, for example, a screen or sand filter before, after, or both before and after contacting with chlorine and chloramine destroying sorbent material products or mixture of chlorine and chloramine destroying sorbent material products and non-chlorine and chloramine destroying to remove particulates. In further embodiments, the methods include the step of disinfecting the water to remove biological contaminants such as bacteria or other microorganisms, and in some embodiments, the methods may include the step of introducing a disinfectant into the water. In still further embodiments, the methods may include the step of clarifying the water, adjusting the pH of the water, and the like and combinations thereof.

The performance of the sorbent material products of the invention is measured in various ways, including the "chloramine destruction number" (CDN) or "chlorine destruction number" (Cl-DN) which is quantified below in the experiments section. These values quantify the amount of chloramine and/or chlorine which can be removed from water by the sorbents of the invention. For the CDN or chloramine destruction number, the invention contemplates values of about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 12.0, about 12.5, about 13.0, about 13.5, about 14.0, about 14.5, about 15.0, about 15.5, about 16.0, about 16.5, about 17.0, about 17.5, about 18.0, about, 18.5, about 19.0, about 19.5, about 20.0, about 20.5, about 21.0, about 21.5, about 22.0, about 22.5, about 23.0, about 23.5, about 24.0, about 24.5, about 25.0, about 25.5, about 26.0, about 26.5, about 27.5, about 28.0, about 28.5, about 29.0, about 29.5, about 30.0, about 35.0, about 40.0, about 45.0, about 50.0, about 55.0, about 60.0, about 65.0, about 70.0, about 75.0, about 80.0, or any range that includes at least two of these values as the endpoints. Alternatively, the CDN can be a range with these numbers as a lower performance bound, such as at least about 4.0, at least about 4.5, at least about 5.0, at least about 10.0, at least about 15.0, at least about 20.0, at least about 23.0, at least about 50.0, at least 55.0, at least about 60.0, at least about 65.0, at least about 70.0, at least about 75.0, at least about 80.0. In some embodiments, the chloramine destruction number is measured with respect to mono-chloramine.

The performance according to the chlorine destruction number (Cl-DN) may be about 70.0, about 75.0, about 80.0, about 85.0, about 90.0, about 95.0, about 100.0, about 110.0, about 120.0, about 120.0, about 140.0, about 150.0, about 160.0, about 170.0, about 180.0, about 190.0, about 200.0, about 210.0, about 220.0, about 230.0, about 240.0, about 250.0, or any range that is formed of at least two of these values as the endpoints. The performance according to the chlorine destruction number can also be at least about 70.0, at least about 75.0, at least about 80.0, at least about 85.0, at least about 90.0, at least about 95.0, at least about 100.0, at least about 150.0, at least about 200.0, or at least about 250.0, or any combination of those ranges. The chlorine destruction number may be about 80.0 to about 150.0, or about 120.0 to about 200.0 or about 170.0 to about 250.0.

It is believed that a measurable factor in the performance of the sorbents of the invention is the amount of "edge" nitrogen, which is distinct from the "center" nitrogen in that "edge" nitrogen atoms are part of a pyrrole or pyridine group residing at the edge of a graphitic sheet or plane. These nitrogen atoms are the most labile and interact with the various compounds that the sorbents contact, such as chloramine and chlorine atoms. The amount of edge nitrogen can be identified by surface analysis techniques such as X-ray photoelectron spectroscopy (XPS). The amount of edge nitrogens as measured by XPS or any other surface analysis technique may be about 0.1 at. % to about 2.0 at. %, about 0.2 at. % to about 1.7 at. %, about 0.2 at. % to about 1.5 at. %, or about 0.2 at. % to about 1.2 at. %, about 0.2 at. % to about 1.0 at. %, about 0.2 at. % to about 0.8 at. %, about 0.2 to about 0.6 at. %, about 0.2 at. % to about 0.4 at. %, or any combination of the above ranges. The amount of edge nitrogen can also be about 0.1 at. %, about 0.2 at. %, about 0.3 at. %, about 0.4 at. %, about 0.5 at. %, about 0.6 at. %, about 0.7 at. %, about 0.8 at. %, about 0.9 at. %, about 1.0 at. %, about 1.1 at. %, about 1.2 at. %, about 1.3 at. %, about 1.4 at. %, about 1.5 at. %, about 1.6 at. %, about 1.7 at. %, about 1.8 at. %, about 1.9 at. %, about 2.0 at. %, or any range that is formed by the combination of two of those values as endpoints of the range, again as measured by XPS or any other surface analysis technique.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

Activated carbon samples were tested for removal of chlorine and chloramine. Chloramine refers to monochloramine, di-chloramine, and tri-chloramine. When ammonia is in equilibrium with chlorine in solution the form of chloramine is pH dependent. The chloramine solution comprising 1.5 g of ammonium chloride, 12.5 mL of 5% sodium hypochlorite and deionized water was mixed to obtain a 1 L solution of 300 ppm chloramine at a pH of 9.0. At a pH value of 9.0, the chloramine species that is present at equilibrium is the mono-chloramine form, which is the most difficult to destroy. The solution was buffered using 1.25 g sodium carbonate to maintain the solution pH during evaluation. The chlorine solution comprised 12.5 mL of 5% sodium hyprochlorite and deionized water to obtain 1 L of a 300 ppm chlorine solution. One liter of the 300 ppm respective solution was added to an Erlenmeyer flask that was placed in a water bath controlled to 20° C. A constant volume of 2.0 mL activated carbon (sized at 80×325 mesh) was added to the agitated 1 L chloramine or chlorine solution for each sample analysis. The volume of the carbon used was determined from the apparent density of the 80×325 carbon as determined by ASTM Method D-2854. The concentration of total chlorine in solution was measured at various time points over a 150 min period by taking aliquots and then analyzing using a standard HACH colorimetric EPA accepted method 10070 for total chlorine. The concentration of chloramines was measured using the NSF/ANSI-42 (2015).

Figure 1:
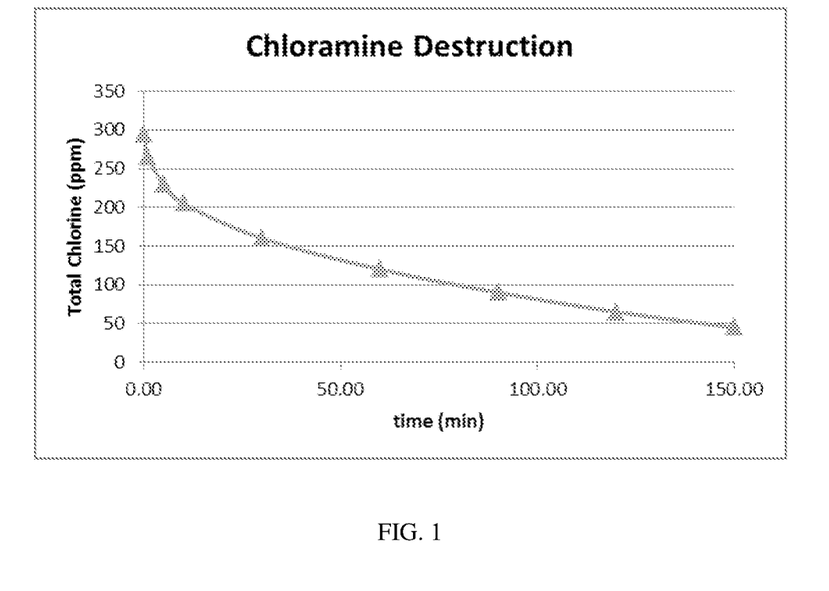
FIG. 1 is graph of chlorine concentration vs. time data for each activated carbon sample.
Figure 2:
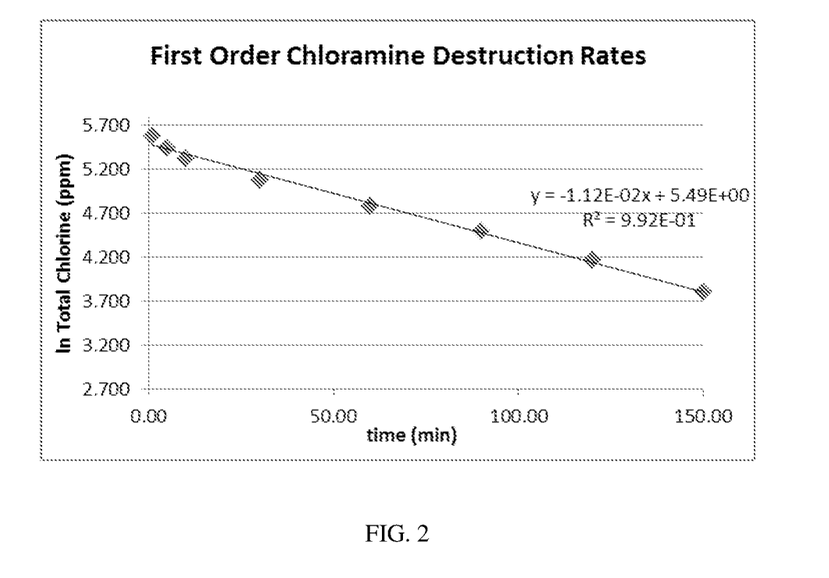
FIG. 2 is a graph of the natural log of total chlorine concentration vs. time to linearize the data according to first order kinetic theory.

After an activated carbon is analyzed experimentally, the concentration vs. time data for each activated carbon sample is plotted. The results are shown in FIG. 1. The results are then replotted as the natural log of total chlorine concentration vs. time to linearize the data according to first order kinetic theory. The replotted results are shown in FIG. 2. A linear fit is then applied to the data and the slope of the linear fit is determined. The slope was always negative, since the initial concentration of total chlorine decreased over the 150 min period. As a result, the absolute value of the slope, multiplied by 1000, is used quantify the rate of chloramine and chlorine destruction (removal). The larger the absolute slope, the more effective the activated carbon is at removing chlorine and chloramine. For these experiments, the slope resulting from the linear fit of the first order kinetic experimental data, with the multiplication by 1000, is referred to as the "chloramine destruction number" or CDN. For destruction of chlorine, the same procedure is performed on the experimental results of chlorine concentration and the resulting value is referred to as the "chlorine destruction number" of Cl-DN.

In addition to chloramine, this embodiment is also effective at removing chlorine from aqueous streams. The ability of the calcined activated carbon to remove chlorine was assessed as described above, however, the test solution is made without the addition of ammonium chloride, and therefore the solution contains 300 ppm chlorine. Activated carbon particle size for chlorine analysis was 95%-325 mesh, which corresponds to 95% of the activated carbon particles passing through a 325 mesh, which is equivalent to openings of 44 μm in size. The analysis of the chlorine concentration vs. time data and its first order kinetic slope remains the same, however, and the slope of the linear fit of this data is referred to as the "chlorine destruction number" or Cl-DN.

Example 2

Two types of coal-based activated carbon were used as sorbent intermediate materials. FILTRASORB 400 (F400) is a bituminous coal based activated carbon having an iodine number of 1000 (minimum), 2 wt. % maximum moisture, effective size of 0.55 mm-0.75 mm, maximum uniformity coefficient of 1.9, minimum abrasion number of 75, and a screen size by weight on US Sieve Series of 5 wt. % maximum on 12 mesh (1700 μm opening) and 4 wt. % maximum on 40 mesh (425 μm opening size). The F400 activated carbon is available from Calgon Carbon Corp. of Pittsburgh, PA CENTAUR is a coal based activated carbon that has been prepared according to U.S. Pat. No. 6,342,129 and is available from Calgon Carbon Corp. of Pittsburgh, PA Samples in Table 1 identified were oxidized in a tube furnace at 500° C. for one hour with air. After the samples were cooled, samples identified as having urea addition were impregnated with a 50% urea in water solution at a ratio of 4 mL of urea solution to 10 grams of carbon. Calcination was carried out in a tube furnace at 950° C. for one hour in nitrogen followed by cooling in nitrogen. Activations were carried out in a tube furnace at 950° C. for 15 minutes in a steam environment. Preoxidation of activated carbon increases final nitrogen content of the activated carbon. This is shown in Table 1, where in each case, the preoxidized samples contained more nitrogen (Total Nitrogen, wt. %), as determined by elemental analysis (Galbraith Labs) than its non-oxidized counterpart. All samples were treated with same amount of urea precursor. Additionally, the preoxidized samples had higher CDN values and therefore were more effective at destroying chloramine.

TABLE 1

Effect of Pre-oxidation and Urea Addition on Nitrogen Content and Chloramine Destruction Characteristics of Activated Carbon

| Activated Carbon | Thermal Treatment | CDN | Total Nitrogen (wt. %) |
|---|---|---|---|
| F400 & Urea Addition | Steam Activated | 3.9 | 0.98 |
| F400, Preoxidized, & Urea Addition | Steam Activated | 4.8 | 1.04 |
| F400 & Urea Addition | Calcined | 4.2 | 1.10 |
| F400, Preoxidized, & Urea Addition | Calcined | 10.8 | 1.62 |
| F400, Preoxidized | Steam Activated | 2.0 | 0.77 |
| F400, Preoxidized | Calcined | 2.8 | 0.69 |
| F400 | Steam Activated | 2.3 | 0.94 |
| F400 | Calcined | 1.9 | 0.78 |
| F400 | No Treatment | 1.4 | 0.67 |
| F400, Preoxidized | No Treatment | 2.2 | 0.53 |
| CENTAUR & Urea Addition | Steam Activated | 6.2 | 1.43 |
| CENTAUR, Preoxidized, & Urea Addition | Steam Activated | 11.0 | 1.63 |
| CENTAUR & Urea Addition | Calcined | 11.8 | 1.18 |
| CENTAUR, Preoxidized, & Urea Addition | Calcined | 21.8 | 2.00 |
| CENTAUR, Preoxidized | Steam Activated | 4.5 | 0.91 |
| CENTAUR, Preoxidized | Calcined | 6.2 | 1.26 |
| CENTAUR | Steam Activated | 3.7 | 1.28 |
| CENTAUR | Calcined | 5.2 | 1.08 |
| CENTAUR | No Treatment | 3.1 | 1.09 |
| CENTAUR, Preoxidized | No Treatment | 3.6 | 0.97 |

Figure 3:
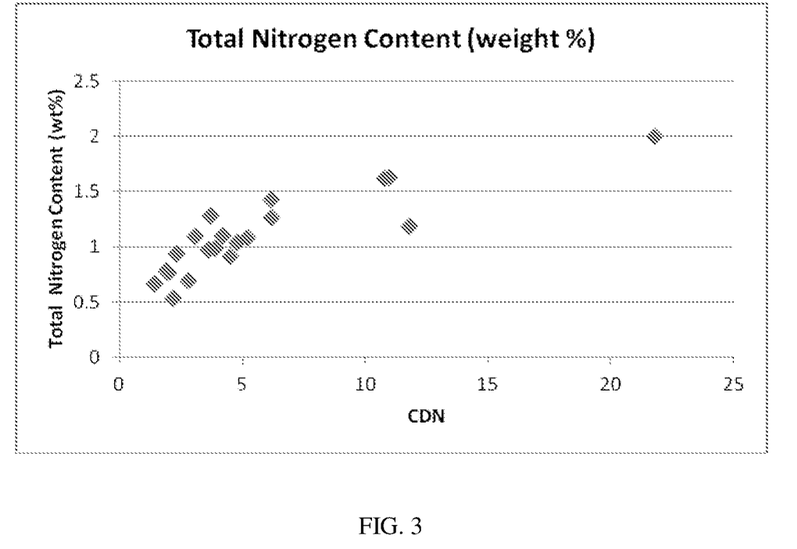
FIG. 3 graphically represents to relationship between total nitrogen and CDN values.

In the prior art, the presence of the activating or oxidizing gas at high temperature has the negative effect of reducing product yield and potentially reducing the nitrogen content of the final product through attack of the carbon structure by oxygen at high temperatures. Table 1 demonstrates the effectiveness and benefit of the calcination step because the CDN values for all calcined samples are higher than the CDN values of activated samples. This was true for both non-oxidized and preoxidized activated carbons, although the highest CDN values were obtained when the activated carbon is preoxidized. FIG. 3 graphically represents to relationship between total nitrogen and CDN values.

Example 3

The type of nitrogen incorporated into the activated carbon was characterized using x-ray photoelectron spectroscopy (XPS). This method was applied to the activated carbon samples listed in Table 1. The types of nitrogen present in the activated carbon are characterized as either an "edge" nitrogen or a "center" nitrogen. In the "edge" nitrogen, the nitrogen atom is part of a pyrrole or pyridine group residing at the end or edge of a graphitic sheet or plane, and the "edge" nitrogen is identified during XPS analysis by having a binding energy of −399 eV.

In the "center" nitrogen, the nitrogen atom is bonded as part of the internal structure of several fused aromatic rings. The center nitrogen has a characteristic binding energy of −401 eV when analyzed using XPS. In the embodiments disclosed, as one examines the type of nitrogen present in the urea treated F400 or CENTAUR activated carbons of Table 1, there is a notable increase in the percentage of "edge" type nitrogen when the sample is calcined vs. steam activated. This trend is highlighted in Table 2.

TABLE 2

Comparison of Edge to Center Nitrogen in Urea Treated Activated Carbon

| Activated Carbon | Thermal Treatment | CDN | N-XPS (atom %) | Edge N (%) | Center N (%) | Edge N (atom %) | Center N (atom %) |
|---|---|---|---|---|---|---|---|
| F400 & Urea Addition | Steam Activated | 3.9 | 0.7 | 14.3 | 85.7 | 0.10 | 0.60 |
| F400 & Urea Addition | Calcined | 4.2 | 0.5 | 20 | 80 | 0.10 | 0.40 |
| F400, Preoxidized, & Urea Addition | Steam Activated | 4.8 | 0.7 | 0 | 100 | 0.00 | 0.70 |
| F400, Preoxidized, & Urea Addition | Calcined | 10.8 | 1.1 | 36.4 | 63.6 | 0.40 | 0.70 |
| CENTAUR & Urea Addition | Steam Activated | 6.2 | 0.9 | 11.1 | 88.9 | 0.10 | 0.80 |
| CENTAUR & Urea Addition | Calcined | 11.0 | 1.2 | 33.3 | 66.7 | 0.40 | 0.80 |
| CENTAUR, Preoxidized, & Urea Addition | Steam Activated | 11.8 | 0.8 | 37.5 | 62.5 | 0.30 | 0.50 |
| CENTAUR, Preoxidized, & Urea Addition | Calcined | 21.8 | 1.5 | 40 | 60 | 0.60 | 0.90 |

In all embodiments, the calcined activated carbons show increased percentages of nitrogen in the edge form versus the center form when compared to activated carbons that have been steam activated. All of the calcined samples also have CDN values that are higher than those samples which were steam activated. In some instances, the CDN values can nearly double for samples which were calcined versus samples which were only steam activated. It is a novel and unexpected finding of this invention that that larger fractions of edge nitrogen are produced when the activated carbon is inertly calcined and that these samples exhibit superior, faster chloramine removal kinetics than their steam activated (and thus gasified) counterparts.

Figure 4:
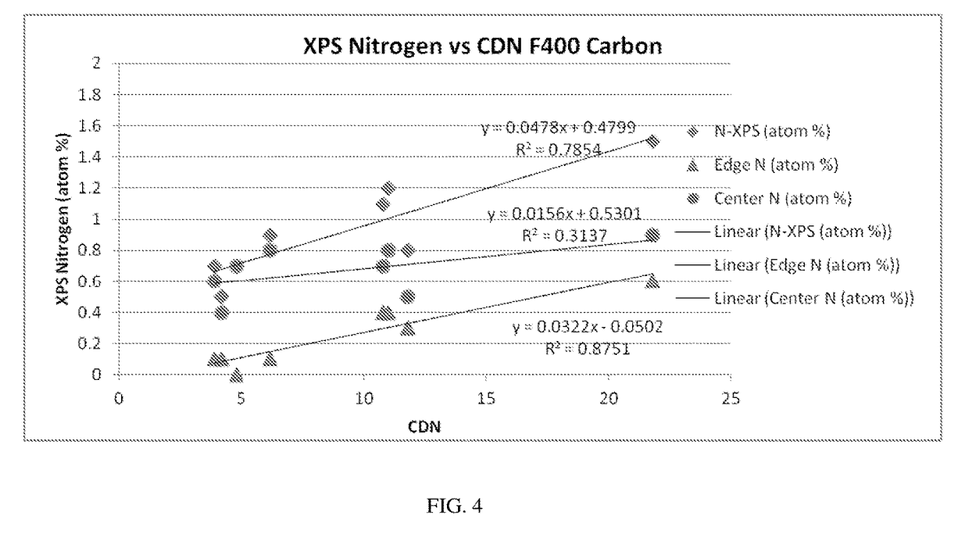
FIG. 4 shows the effect of the various forms of nitrogen on the CDN.

FIG. 4 shows the effect of the various forms of nitrogen on the CDN. The amounts of nitrogen in each instance were determined by XPS. As total atomic nitrogen increased, so did the CDN value. Of special note is that the increase in the total atomic nitrogen by XPS is primarily due to an increase in the edge nitrogen and not the center nitrogen. The edge nitrogen is the most chemically labile nitrogen during the gasification or activation step(s). However, during calcination, the edge nitrogen tends to remain with the carbon structure.

While not wishing to be bound by theory, the results appear to indicate that the proposed nitrogen treatments result in an increase in edge nitrogen, and that most of the increase in total or bulk nitrogen, which includes center and edge nitrogen, is the result of this addition in the edge nitrogen. This is important because it is the edge nitrogen which influences surface interactions on the sorbent and therefore the performance of the sorbent.

Example 4

Table 3 demonstrates the effect of added water or steam into the air atmosphere used for oxidation. To test this effect, F400 carbon was first oxidized in air without added water at 500° C. for one hour in a tube furnace and subsequently impregnated with urea solution and calcined as provided in Example 2 above. The results of this test are shown in Table 3 as the "Dry Air" sample.

Next, F400 carbon was provided along with humidified air that was saturated with water vapor at 25° C. The F400 carbon and humidified air was then heated to 500° C. for one hour in a tube furnace and subsequently impregnated with urea solution and calcined as provided in Example 2 above. The results of this test are shown in Table 3 as the "Humidified Air" sample. Table 3 shows that there is a significant improvement in the CDN of the carbon when water is used in conjunction with the primary oxidant, in this case, air.

TABLE 3

Effect of Water on the Air Oxidation of F400 Carbon at 500° C.

| Oxidation Atmosphere | CDN |
| --- | --- |
| Dry Air | 10.8 |
| Humidified Air | 16.4 |

Example 5

The effect of different nitrogen-containing precursors and their ability to impart catalytic activity on the activated carbon are provided in Table 4. For these tests, all nitrogen-containing precursors were added to F400 carbon at a ratio of one mole of nitrogen to 10 moles of carbon from the activated carbon. For the purposes of calculating the molar amount of nitrogen to add via nitrogen-containing precursors for this experiment, it was assumed that the activated carbon was composed entirely, or 100%, of carbon atoms.

Nitrogen-containing precursors identified as "Dry" in Table 4 were added as a dry admix to the oxidized activated carbon due to the lack of water solubility. Those listed as "Gas" were used in the gas form after air oxidation of the activated carbon. Materials were thermally treated as given in Example 2. From the experimental data shown in Table 4, only those nitrogen-containing precursors containing reduced nitrogen in the −3 oxidation state provided any substantial increase in CDN values over those in other oxidation states.

It is also contemplated that the source of nitrogen may be added to or in the sorbent raw materials or sorbent intermediate itself. In one experiment, polyacrylonitrile was provided as the nitrogen precursor with activated carbon as the sorbent intermediate. The polyacrylonitrile and the activated carbon were then combined as a dry admixture. The resulting sorbent product had a CDN of 4.6. While not wishing to be bound by theory, it is believed that thermal decomposition of the polyacrylonitrile polymer resulted in nitrogen compounds reacting with the carbon skeleton and having an effecting the destruction of chloramine and similar compounds.

TABLE 4

Effect of Nitrogen-containing Precursor on CDN for F400 Carbon

| Nitrogen Source | Nitrogen Oxidation State | CDN |
| --- | --- | --- |
| Polyacrylonitrile (PAN) | −3 | 4.6 |
| Ammonia (Gas) | −3 | 6.8 |
| Ammonium Carbonate (Dry) | −3 | 11.6 |
| Ammonium Thiocyanate | −3 | 25.8 |
| Azodicarbonamide (Dry) | −3 | 12.5 |
| Diammonium Phosphate | −3 | 2.0 |
| Dicyandiamide | −3 | 15.3 |
| Guanidine Hydrochloride | −3 | 24.9 |
| Guanidine Thiocyanate | −3 | 3.0 |
| Guanine (Dry) | −3 | 22.3 |
| Melamine (Dry) | −3 | 26.2 |
| Nitrogen (Gas) | 0 | 1.9 |
| Nitrogen Dioxide (Gas) | 4 | 2.6 |
| Nitrous Oxide (Gas) | −3 and +5 | 11.4 |
| Sodium Nitrate | +5 | 1.7 |
| Sodium Nitrite | +3 | 1.6 |
| Thiourea | −3 | 14.1 |
| Urea | −3 | 11.4 |

Example 6

Preoxidized, calcined activated carbon was also assessed for chlorine destruction, characterized by the Cl-DN value. Table 5 highlights the performance of CENTAUR as a sorbent product or as a sorbent intermediate. Each test of Cl-DN was prepared as provided in Example 2 above.

TABLE 5

Chlorine Destruction Performance of Calcined Activated Carbons Activated Carbon

| Activated carbon | Thermal Treatment | Cl-DN |
| --- | --- | --- |
| CENTAUR | Steam Activated | 72.8 |
| CENTAUR, Preoxidized, No Urea Addition | Calcined | 84.6 |

TABLE 5-continued

Chlorine Destruction Performance of Calcined Activated Carbons
Activated Carbon

| Activated carbon | Thermal Treatment | Cl-DN |
|---|---|---|
| CENTAUR, Preoxidized, Urea Addition | Calcined | 145.9 |

In Table 5, the Cl-DN of steam activated CENTAUR sorbent intermediate material was 72.8. If the CENTAUR sorbent intermediate material is preoxidized and then calcined without the addition of a urea nitrogen-containing precursor, the Cl-DN still improves to almost 84.6. However, as was the case in chloramine, if the CENTAUR activated carbon is used as the sorbent intermediate material and is first preoxidized, then mixed with urea, and finally calcined, the Cl-DN increases dramatically to 145.9. This significant increase in the Cl-DN value indicates that when the activated carbon is preoxidized, mixed with a nitrogen source in the −3 oxidation state, and calcined, it is very effective for removing chlorine.

Example 7

Oxidation of carbon was undertaken using the oxidizing agents contemplated above. 50 g of F400 activated carbon was contacted with 150 mL of the oxidizing agents provided in Table 1 below. The oxidizing agent concentration ranged from 1-32% in water and was stirred for 24-72 hours while in contact with the carbon. The mixture was filtered and dried at 150° C. for three hours followed by impregnation with a 50% urea solution in water at a ratio of 10 g carbon to 4 mL of 50% urea solution. The impregnated carbon was then calcined in nitrogen at 950° C. for 1 hour. The results were measured for their chloramine destruction numbers and are listed in Table 6 below.

TABLE 6

Oxidizing Agents and Effect On Chloramine

| Oxidant (as applied to urea impregnated F400) | Chloramine Destruction Number (CDN) |
|---|---|
| None - No Oxidation | 3.7 |
| Air at 500° C. | 10.8 |
| Nitric Acid | 6.7 |
| Potassium Peroxymonosulfate | 21.2 |
| Potassium Persulfate | 32.6 |
| Sodium Persulfate | 22.3 |
| H₂O₂ | 8.2 |
| Peracetic Acid (mixture of acetic acid and H₂O₂ applied)† | 54.2 |
| Acetic Acid | 3.5 |
| H₂O₂ + Urea (mixture applied)† | 8.9 |
| Peracetic Acid + Urea (mixture applied)† | 25.5 |
| Hypochlorite | 2.5 |
| Benzoyl Peroxide | 2.5 |

†Mixture of compounds applied simultaneously; no subsequent urea. The separate impregnation of 4 mL urea per each 10 g of F400 activated carbon was not applied after the oxidizing agent because the urea was already applied.

From the results, it is shown that peracetic acid treatment produces excellent results, with a CDN of 54.2. Other oxidizing agents such as potassium persulfate, potassium peroxymonosulfate, and peracetic acid also provided good results as oxidants followed by or in combination with treatment with urea. It is expected that any other reduced nitrogen precursor in combination with the disclosed oxidizing agents, especially those nitrogen compounds in the −3 oxidation state, would be suitable for the production of these high CDN values, or for the production of high Cl-DN values which are discussed above.

Example 8

Additional testing was performed using the CENTAUR activated carbon described in the previous Examples. 15 g of CENTAUR activated carbon was contacted with 150 mL of peracetic acid in concentrations up 20.5% in water and was stirred for periods of up to 120 hours. The mixture was filtered and then the carbon was dried at 80° C. for up to 12 hours. After drying, the carbon was impregnated with a 50% urea solution in water at a ratio of 10 g carbon to 4 mL urea solution. The impregnated carbon was then calcined in nitrogen at 950° C. for 1 hour. The resulting carbon was measured for its chloramine destruction number and the result is listed in Table 7 below:

TABLE 7

Effect of Oxidation

| Oxidant | Chloramine Destruction Number (CDN) |
|---|---|
| None - No oxidation | 11.8 |
| Air - 500° C. | 21.8 |
| Peracetic Acid (acetic acid and H₂O₂) | 24.9 |

From this result, it is demonstrated that the peracetic acid oxidation treatment produces a significant improvement in chloramine destruction with a CDN of value of 24.9. This compares with a similarly impregnated CENTAUR activated carbon with no prior oxidation, which only had CDN of 11.9. Furthermore, an air-oxidized, urea-impregnated CENTAUR achieved a CDN value of 21.8.

The invention claimed is:

1. A method for making a sorbent material product, the method comprising:
   providing a sorbent material feedstock;
   oxidizing the sorbent material feedstock with an oxidizing agent temperature of about 300° C. to about 600° C., the oxidizing agent selected from the group consisting of potassium peroxymonosulfate, potassium persulfate, ammonium persulfate, sodium persulfate, peracetic acid, a mixture of peracetic acid and urea, and combinations thereof;
   adding a nitrogen-containing precursor to the oxidized sorbent material feedstock, wherein the nitrogen-containing precursor is a reduced nitrogen compound; and
   heating the oxidized sorbent material feedstock and nitrogen-containing precursor to a temperature of about 850° C. to about 1050° ° C. under an inert atmosphere to thereby form the sorbent material product,
   wherein the sorbent material feedstock includes at least one of activated carbon, reactivated carbon, and combinations thereof, formed from bituminous coal, sub-bituminous coal, lignite coal, anthracite coal, or combinations thereof, and
   wherein the sorbent material product has a chloramine destruction number (CDN) of at least 10.0 and a chlorine destruction number (Cl-DN) of at least about 80.0,
   wherein the CDN is the absolute value of the first order linear kinetic fit, multiplied by 1000, that is applied to natural log of a concentration of chloramine in water versus time when the initial concentration of chloramine is decreased over a period of 150 minutes, and wherein the Cl-DN is the absolute value of the first order linear kinetic fit, multiplied by 1000, that is applied to natural log of a concentration of chlorine in water versus time when the initial concentration of chlorine is decreased over a period of 150 minutes.

2. The method of claim 1, wherein the sorbent material product has a CDN of 10.0 to about 60.0.

3. The method of claim 1, wherein the Cl-DN value is about 80.0 to about 250.0.

4. The method of claim 1, wherein the sorbent material product has a nitrogen edge concentration of at least about 0.20 atom %.

5. The method of claim 4, wherein the sorbent material product has a nitrogen edge concentration of about 0.20 atom % to about 2.0 atom %.

6. The method of claim 1, wherein the nitrogen-containing precursor has an oxidation state of −3.

* * * * *